Oct. 31, 1961 J. F. PAGE ET AL 3,007,137

INFORMATION HANDLING SYSTEM

Filed Dec. 14, 1956 3 Sheets-Sheet 1

INVENTORS
JOHN F. PAGE &
ARNOLD M. SPIELBERG
BY Morris L. Rabkin
ATTORNEY

INVENTORS
JOHN F. PAGE &
ARNOLD M. SPIELBERG
BY Morris Rabkin
ATTORNEY

INVENTORS
JOHN F. PAGE &
ARNOLD M. SPIELBERG
BY Morris Rabkin
ATTORNEY

United States Patent Office 3,007,137
Patented Oct. 31, 1961

3,007,137

INFORMATION HANDLING SYSTEM

John F. Page and Arnold M. Spielberg, Haddonfield, N.J., assignors to Radio Corporation of America, a corporation of Delaware Filed Dec. 14, 1956, Ser. No. 628,456
9 Claims. (Cl. 340—172.5)

This invention relates to information handling systems, and more particularly to a system for rearranging information represented by signals recorded in storage media.

In modern high speed information handling systems, certain specialized data processing equipment has been developed to accomplish electronically the various tasks of assembling, editing, and revising information within a large information storage or file. Large scale general purpose computers may be programmed to perform these operations which are especially time consuming when a so-called variable word-length is used.

However, special purpose data processing machines have been developed to handle the more routine tasks of rearranging the information stored within large size serial storage files. Individual messages which comprise the body of information may include order-determining portions which rank the messages according to a desired order of precedence. Rules may be established and mechanized according to which one message precedes or follows another message. Where the order of precedence is indeterminate, as in the case of equality of the order-determining portions, an arbitrary selection may be provided.

The rearrangements may include: "sorting" unordered messages to place them in a desired ordered relationship; "extracting" those messages which fall in a specific class, identified either from a list of messages to be extracted, or from a class designator which includes all messages of a particular type; "merging" separate groups of messages into a composite group, whereby, for example, new information may be added to an existing file to bring it up to date. The "merge" operation may be modified to include a substitute and delete feature so that "new" messages replace superseded "old" messages in the file and certain other selected messages may be omitted from the file.

As the volume of stored information increases, the time needed to pass the entire file through a data processing machine also increases. It has been found desirable to have a system which may perform several data processing tasks during one review of the file.

Accordingly, it is an object of the present invention to provide a special purpose data processing machine.

It is a further object of the invention to provide an electronic apparatus for merging the groups of messages of several storage devices, into one ordered group.

It is a further object of the invention to provide an electronic apparatus for extracting messages from a first storage device according to a list of messages in a second storage device.

It is a still further object of the invention to provide an improved apparatus for merging messages and extracting messages according to a list in one operation.

It is a further object of the invention to provide an improved special purpose data processing machine responsive to the order-determining portions of variable-length messages in a file for merging messages into a desired order of precedence and for extracting messages according to a list in a single review of the file.

In one embodiment of the invention, three storage devices for example, magnetic tape units, are used for information input. A first input tape contains information which is used to revise a second file tape to modify the file according to the most recent information at hand. The first tape may also contain a list of the order-determining portions of messages which are to be deleted from the file. A third input tape contains a list of the order-determining portions of the individual messages whose extraction is desired. Two output tapes are provided. The first output tape contains revised and updated information which becomes the reference file. The second output tape contains the messages extracted according to the list on the third input tape. A memory of limited size stores the order-determining portion, or criterion, of the message last read on the revising or first tape and a similar memory stores the criterion of the last read message of the list or third tape.

The old reference or second tape runs and its criterion is compared with the criteria of both the first tape and the third tape. The first and third tape criteria are also compared with each other. Comparison result signals are applied to a tape selection and control unit. A message is then transferred from a selectively enabled input tape to a selectively enabled output tape.

One pass of a reference file througha system according to the present invention produces an edited, updated file at one output and a file of selected messages at a second output. In systems of the prior art, a complete pass of the file was necessary to update the file and a separate, second complete pass was required to extract the desired messages.

The novel features of the present invention as well as the invention itself, both as to its organization and method of operation, will best be understood from the following description when read in connection with the accompanying drawings, in which.

Figure 1:
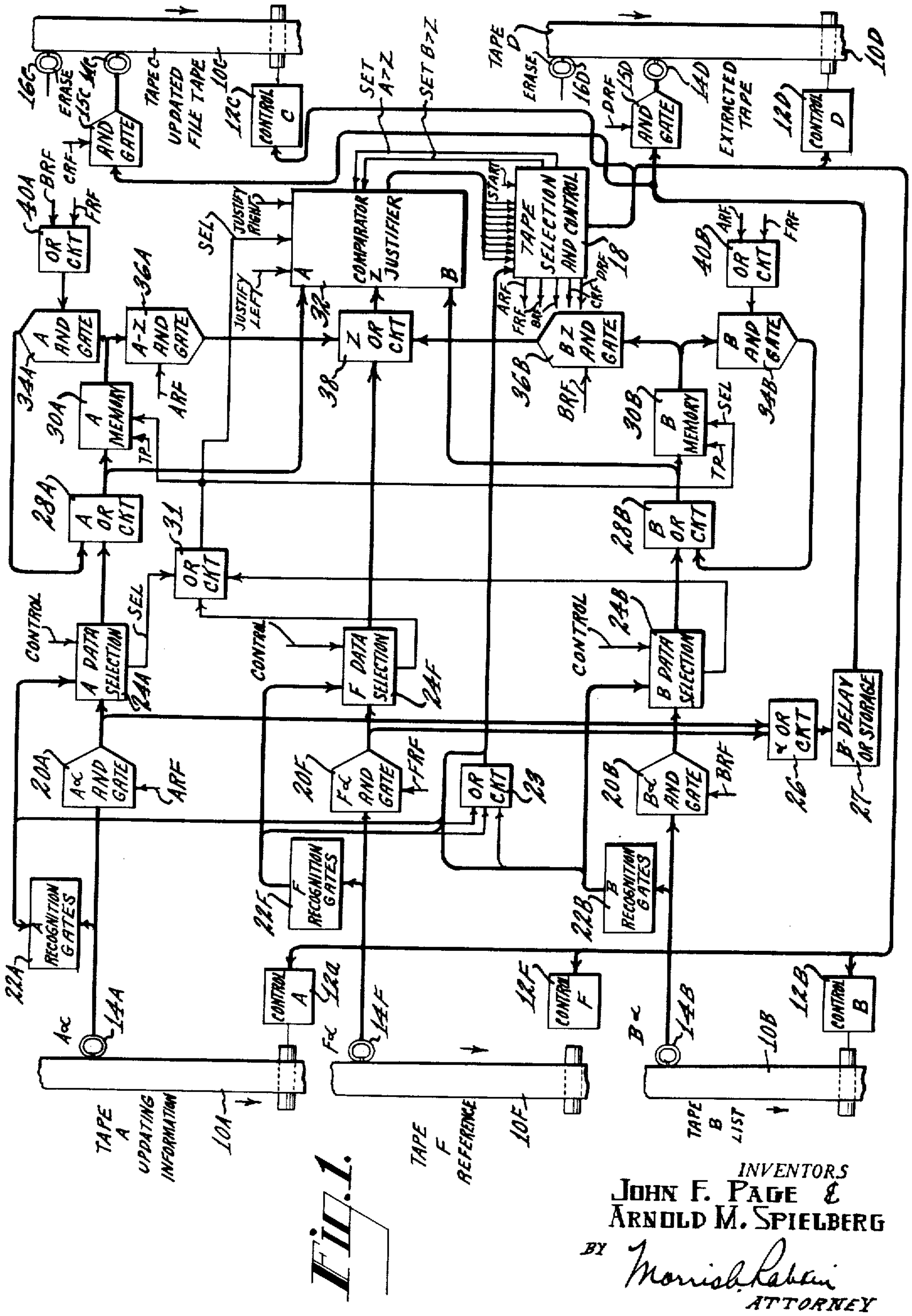
FIGURE 1 is a block diagram of a special purpose data processing machine according to the present invention.

A discussion of certain prior copending applications may be useful to an understanding of the present invention. In a copending application of Howard P. Guerber and Stephen M. Fillebrown, Serial No. 556,128, filed December 29, 1955, entitled "Sorting Device" and assigned to the assignee of the present invention, a special purpose data processing machine is described which arranges a file of serially stored messages into an ordered relationship. The data processing machine of that application makes "on the fly" comparisons of criteria from messages of two input tapes, comparing them with each other and with that of the last message transferred.

An earlier filed copending application of William R. Ayres and Joel N. Smith, entitled "Information Handling System," Serial No. 440,646, filed July 1, 1954, and assigned to the assignee of the present invention, describes another large scale information handling system which can perform the "merge" or "extract" process in separate operations.

Also described in the earlier filed application, is a means for handling the information in a serial storage such as magnetic tape, which means, for convenience, may be referred to as alpha-beta circuitry. Each tape transport device is provided with two read-write heads, designated $\alpha$ and $\beta$ heads, respectively. The $\alpha$ head of the tape station reads the criterion portion of each incoming message into the comparison circuits. The $\beta$ head, disposed serially from the $\alpha$ head in the path of tape travel, detects the same information of each message at a later time, and serves to transfer entire messages. In the devices of the prior applications, information is arranged in messages. Each message may be made up of individual items or words which in turn are made up of characters. Characters are one of a set of elementary marks or events which may be combined to express information. In a binary system, distinctive signals or marks may represent the binary 1 and different signals or marks, or, the absence of signals or marks may represent binary 0. Known schemes utilize a coded notation in which individual binary digits in parallel combination represent characters and the characters are arranged serially to form items, words, and messages. Distinctive code characters are provided to indicate editing functions. Several characters comprising an item are set off by a distinctive item separator symbol, ISS. Items grouped to form a message are distinguished one from the other by a special start message SM character at the beginning of each message and a different end message character, EM, at the end of each message. A delete message character, DM, is provided for editing purposes.

Generally, a message has no specified length in a variable word length system. However, certain system elements may operate more efficiently with blocks of information having no more than a fixed number of characters. A variable length message may be composed of several fixed length blocks and a block of lesser length, if needed. The message may start and end with distinctive start mesage and end message characters. Intermediate blocks may have no such distinctive characters.

In practicing the present invention it has been found preferable to utilize α—β circuitry and logic. Storage devices providing only a single output may be used in connection with the system as shown in the copending application of Howard P. Guerber, Linder C. Hobbs, and Arnold M. Spielberg, entitled "System to Generate and Maintain Intermessage Gaps," filed July 30, 1956, Serial No. 600,937, since issued as Patent No. 2,907,010 on September 9, 1959, and applicants' copending application entitled "Information Transferring System," Serial No. 616,843, filed October 18, 1956, both assigned to the assignee of the present invention.

A buffer or interim storage is provided whose output lags the input by the same time interval by which a β head output would lag the α head output if a β head were present. The criterion is detected at the α head and is compared with stored criteria. Tape selection and control decisions are made in the logical circuits. An output tape is started and the message emerging from the buffer is transferred to the output tape. Should a decision to select a different input tape for message transfer be generated, any message transfer in progress is completed and all tapes are stopped.

The above-mentioned application of Guerber, Hobbs, and Spielberg, describes suitable tape control logical circuitry for timely energization of input and output tapes on the receipt of tape selection signals.

For an information handling system in which the order of precedence may correspond to increasing binary value, the file then may be arranged in order of ascending criteria values. In such a system the binary value of the criteria of each message may be greater than that of the message it follows and less than that of the message it precedes. The general rule for message transfer in the present invention may be to transfer the input message having the smallest criterion. When messages are of equal value, an arbitrary message order is prescribed.

For ease in reader understanding, multiple lines interconnecting elements of the circuit have been drawn as single cables, indicated by heavy lines. Where single units such as gates connect to heavy lines, it is to be assumed that there are multiple units of identical circuit elements each connected to a different one of the channels in the cable.

In one embodiment, seven channels are used to transmit information characters being represented by the simultaneous combination of signals in the channels to form binary members. A signal may be a pulse or the absence of a pulse, representing respectively, the binary one and the binary zero.

FIGURE 1 is a circuit diagram of a special purpose data processing machine according to the present invention. Shown schematically are the input and output storage devices which, in this embodiment, are magentic tapes 10A, 10F, 10B, 10C, and 10D.

Suitable switching centers of the telephone type may connect any tape in a large size memory system having several tape units to the data processing circuits shown, so that any tape in a library or tape file may be connected to the tape inputs, labelled tape 10A, tape 10F, or tape 10B, or to the tape outputs, labelled tapes 10C, 10D. A tape which is an output tape for one operation may serve as an input tape for some subsequent or different operation by suitable operation of the switching center (not shown).

Each tape unit has a suitable control unit 12A, 12F, 12B, 12C, and 12D which provides energization signals to the tape reeling mechanism, controlling starting, stopping, and the direction of travel of the individual tapes.

Transducing heads 14A, 14F, 14B are mounted adjacent the input tapes 10A, 10F, 10B and similarly other transducing heads 14C, 14D are mounted adjacent the output tapes 10C, 10D. The transducers or read-write heads operate in a fashion corresponding to whether the particular tape is functioning as an input or output tape. Those transducers 14A, 14F, 14B adjacent corresponding input tapes function as reading heads while the transducers 14C, 14D adjacent corresponding output tapes function as writing heads. Output selecting "and" gates 15C, 15D, gate the signals applied to the writing heads 14C, 14D. Erase heads 16C, 16D may be placed adjacent the output tapes 10C, 10D so that a "clean" section of tape always appears opposite the writing heads 14C, 14D.

The individual tape station control units 12A, 12F, 12B, 12C, 12D connect with a multichannel cable which applies on separate channels "start" signals, "stop" signals, and "stop reverse" signals from a tape selection and control unit 18. The multichannel message output of the α, or reading heads 14A, 14F and 14B is applied both to respective α "and" gate sets 20A, 20F, 20B, and to respective sets of recognition gates 22A, 22F, 22B.

The output of the Aα "and" gate 20A is applied to an A data selection unit 24A. The tape F and the tape Bα "and" gates 20F, 20B connect with similar F and B data selection units 24F, 24B. However, the outputs of the Aα "and" gate 20A and the Fα "and" gate 20F, are also applied to an α "or" circuit 26 whose output is applied to a so-called "β" delay or storage unit 27. The output of the β delay 27 is applied to both output selecting "and" gates 15C, 15D. The output selecting "and" gates 15C, 15D are enabled, respectively, by signals CRF, DRF from the tape selection and control unit 18. These signals will be explained in more detail below. Although all of the α heads could share a common set of recognition gates 22, and a common data selection unit 24, for added flexibility the α "and" gate outputs 20A, 20F, 20B are applied respectively to individual data selection circuits 24A, 24F, 24B.

Recognition gates suitable for use in the present invention have been shown in the patent to Ayres, 2,648,829 issued August 11, 1953. Suitable data selection circuits have been described in the copending application of Luis A. Fernandez-Rivas entitled "Data Selection Device," Serial No. 431,627, filed May 24, 1954, since issued as Patent No. 2,926,337 on February 23, 1960, and assigned to the assignee of the present invention.

The output signals of the recognition gates 22A are applied to the A data selection unit 24A. Other control signals are applied to the A data selection unit 24A on a multichannel control cable which connects to a manual keyboard (not shown) with which an operator may initiate signals to select a portion of an incoming message as the criterion of the message.

In one embodiment, tape B contains the list of criteria of desired messages and B data selection unit 24B may be set to select an entire message. However, in the A and F data selection units 24A, 24F, the operator may select different portions of the message as the comparison criteria of the respective messages.

The data selection units 24 provide an output control signal, SEL, which is applied to circuit elements described below. The data outputs of the A and B data selection units 24A, 24B are applied respectively to an A "or" circuit 28A and a B "or" circuit 28B.

The outputs of the A and B "or" circuits 28A, 28B are applied respectively to A and B memories 30A, 30B and to the A and B terminals of a comparator-justifier 32. The A and B memories, 30A, 30B may be any known storage device such as a magnetic drum, magnetic core matrix, a set of sonic delay lines, or a circulating shifting register.

The A and B memories 30A, 30B, are enabled by the selection level, SEL, from a three input SEL "or" circuit 31 whose inputs are connected respectively to the data selection control outputs, SEL, of the A, F, and B data selection units 24A, 24F, 24B. The output of the A memory 30A is applied both to an A "and" gate 34A and to an A—Z "and" gate 36A. Similarly the B memory 30B output connects both to a B "and" gate 34B and to a B—Z "and" gate 36B.

The output of the F data selection unit 24F is applied to a three-input Z "or" circuit 38. The outputs of the A—Z "and" gate 36A and the B—Z "and" gate 36B connect to the other inputs of the Z "or" circuit 38 whose output is applied to the Z terminal of the comparator-justifier 32.

The output of the A "and" gate 34A is applied to the A "or" circuit 28A and similarly, the output of the B "and" gate 34B is applied to the B "or" circuit 28B to recirculate the contents of the respective memories when the corresponding tape is not running.

The tape selection and control unit 18 generates special signals indicating that a particular tape is in motion in a direction arbitrarily designated as the forward direction. These "running forward" signals ARF, FRF, BRF, CRF, and DRF each correspond to a respective one of the tapes. As only one input tape runs forward at any one time, common circuits may be shared and the output may be gated by the one running forward signal. However, both the output tapes 10C, 10D, may run simultaneously, and therefore, the signals CRF and DRF may coexist and may be applied to the respective output selecting "and" gates 15C, 15D.

The ARF signal is applied to enable the $A\alpha$ "and" gate 20A and also the A—Z "and" gate 36A. The FRF signal is applied to enable the $F\alpha$ "and" gate 20F as well as one input of a two-input A running forward "or" circuit 40A, and one input of a two-input B running forward "or" circuit 40B. Similarly, the BRF signal enables the $B\alpha$ "and" gate 20B and the B—Z "and" gate 36B. The output of the running forward "or" circuits 40A, 40B, are applied, respectively, to the A "and" gate 34A and the B "and" gate 34B. The other input of the A running forward "or" circuit 40A is connected to the BRF signal source at the tape selection control unit 18, and the second input to the B running forward "or" circuit 40B is applied by the ARF signal source.

A comparator-justifier suitable for use in the present invention has been shown in a copending application for patent entitled "Multiple Message Comparator," Serial No. 438,372, filed June 22, 1954, by Grant W. Booth and Linder C. Hobbs, since issued as Patent No. 2,865,567 on December 23, 1958, and assigned to the assignee of the present invention. That comparator compares portions of three messages and has means to staticize the comparison results. The result output lines may be labelled "greater than," "equal to," or "less than" represented by the symbols ">," "=," "<."

The comparator justifier 32 compares internally the outputs of the A, B and Z "or" circuits 28A, 28B, 38. When tapes A or F, 10A, 10F are running, the comparison is made between the A input message and the Z input message. However, if tape B, 10B, is running, the A—Z comparison is not made but, rather, it is "remembered" and stored. Similarly, the B—Z comparison is made when tapes B or F, 10B, 10F, are running and is stored from the previous comparison when tape A, 10A, is running. Although the A—B comparison could be made each time, the comparison is made only when tapes A or B, 10A, 10B are running and a comparison result is stored during the running of tape F, 10F.

For comparing alpha-numeric characters represented by binary signals it may be necessary that a so-called "justification" be performed, analogous to the printing arts. If characters representing numbers are to be compared, a number having more digits is considered the larger. If alphabetical characters such as words are being compared, the number of characters per word is not determinative of order unless all characters in the shorter word are identical with the corresponding characters in the longer word. Suitable input terminals are provided on the comparator-justifier 32 for selecting right (for numbers) or left (for letters) justification. A control signal to start comparisons is applied from the SEL "or" circuit 31. The comparison output signals are applied to the tape selection and control unit 18.

In order to start a simultaneous merge extract operation, a start button at the tape selection and control unit 18 is energized. The comparator-justifier decisions are disregarded until each of the three input tapes has read one message.

Tape A, 10A is run forward first. The reading head 14A detects the characters and the A recognition gates 22A recognize the specific signal combinations such as SM, EM, and ISS. Recognition signals control the A data selection unit 24A. When the selected criterion has been reached, the criterion characters are gated out of the A data selection unit 24A through A "or" circuit 28A and are placed in the A memory 30A under the control of the SEL signal.

The individual criterion characters are also applied to the comparator-justifier 32 and the A memory 30A. The memory may be controlled by timing pulses, TP, generated by each character. The memory preferably reads out a character position, reads a new character into the empty position, and then advances to a new character position. The output of memory 30A at this point consists of the characters stored from the previous criterion which are applied to the A "and" gate 34A and the A—Z "and" gate 36A.

The tape A is running forward, an ARF signal enables the A—Z "and" gate 36A, and the output of the A memory 30A, is applied through the Z "or" circuit 38 to the comparator-justifier 32. The A "and" gate 34A remains closed so long as tape A, 10A runs. The A message criterion is placed in the A memory 30A, and a meaningless comparison decision is generated and transmitted to the tape selection and control unit 18. The SM output of the A recognition gates 22A is applied to the SM "or" circuit 23 whose output is also applied to the tape selection and control units 18 overriding the initial result, and generating a signal to stop tape A, 10A, and run tape B, 10B.

In similar fashion, tape B, 10B containing list messages is energized. The transport mechanism starts under the control of the B control 12B and the $B\alpha$ head 14B detects the first B message. The SM symbol of the B message is recognized at the B recognition gates 22B and is applied through the SM "or" circuit 23 to the tape selection and control unit 18.

The B data selection unit 24B is enabled and the B criterion characters are gated into the B "or" circuit 28B and the B memory 30B. The B criterion is stored in the B memory 30B and applied to the comparator-justifier 32. The comparison result is applied to the tape selection and control unit 18 and is also disregarded.

A signal to start tape F, 10F is generated and the characters at the Fα head 14F are applied to the F recognition gates 22F and the Fα "and" gate 20F. The SM recognition signal is applied to the tape selection and control unit 18. The F data selection unit 24F is enabled and the F criterion characters are transmitted to the comparator-justifier 32. The F criterion characters are compared with the A and B criteria. The comparison results are applied to the tape selection and control unit 18 and a decision to run inputs and outputs is generated, determined by the results of this later comparison.

The timing pulses, TP, are applied to the A and B memories 30A, 30B in synchronism with the appearance of characters at tape F, 10F, or, whichever tape happens to be running. The memories will advance and clock out the stored criteria characters. When the F tape 10F is running, the A memory 30A clocks its characters through the A "and" gate 34A, enabled by the running forward A "or" circuit 40A on the application of the FRF signal. The characters are replaced in the A memory 30A through the A "or" circuit 28A, and are applied to the A input terminal of the comparator-justifier 32.

Similarly, the criterion stored in the B memory 30B is also clocked out through the B "and" gate 34B under control of the FRF signal at the running forward B "or" circuit 40B. The characters are returned through the B "or" circuit 28B into the B memory 30B, and also to the B input terminal of the comparator justifier 32.

A tape comparison decision is generated and applied to the tape selection and control unit 18. The tape selection and control unit 18 mechanizes certain selection rules with logical circuitry. The tape selection and control rules may be summarized in the following table, but, in general, the tape presenting the smallest criterion is selected to run. By smallest, it is meant that the binary value of the digits representing the characters of the criterion is less than binary value of the digits comprising the other criteria. It may be seen that if other ordering schemes are used for the organization of the information file, the rules would change accordingly.

TABLE 1

*Selection rules*

Tape A=New message tape
Tape B=List tape
Tape F=Old file tape
Tape C=Updated file tape
Tape D=Extracted tape (1) If a list criterion is less than both a new message criterion and an old file message criterion, run the list tape only.

(2) If a new message criterion is less than both a list criterion and an old file message criterion, run the new message tape, transferring its message to the updated file tape.

(3) If an old file message criterion is less than both a new message criterion and a list criterion, run the old file tape and the updated file tape.

(4) If a new message criterion and a list criterion are equal but both are less than an old file message criterion, run the new message tape, transferring its message to both output tapes.

(5) If a list criterion equals an old file message criterion but is less than a new message criterion, run the old file tape and both output tapes.

(6) If an old file messgae criterion and a new message criterion are equal but are less than a list criterion, run the old file tape only.

(7) If all three criteria are equal, run the old file tape only.

The updated file output tapes receive message which when complete comprise the new reference file. The updated file tape is always run when the new message tape is selected to transfer its message or whenever the old file tape is to transfer its message. The extracted output is run whenever a message being transferred to the updated file tape is equal to a list message.

When, in the embodiment shown, an input tape is running and the decision is to continue running the same tape, the output of the α head 14 has been transferred to a β delay or storage unit 27 of capacity sufficient to hold enough of the message to include the criterion. The tape selection decision is made and the input tape continues to run. The selected output tape is started slightly before the emergence of the message from the β delay 27. The output of the storage is applied to both of the output units but is gated through only to the output that is running forward. The entire message is transferred through the β delay storage 27.

Suitable tape control circuitry and inter-message spacing control logic has been described in the above-mentioned copending application of Howard P. Guerber, Linder C. Hobbs, and Arnold M. Spielberg.

In those tape units not equipped with α and β heads, the input tape must be reversed to the beginning of a message after the criterion of the message has been read and a decision not to run that tape has been reached. The Guerber, Hobbs, Spielberg application disclosed suitable circuits for stopping a tape, reversing the tape until an intermessage space is detected, and stopping the tape with the read head resting in the intermessage gap. As a consequence of the backup cycle, output tapes must be stopped whenever input tapes are stopped to prevent recording of the message portions stored in the β delay 27.

Any logical combination of "and" gates, "or" circuits, and signal inverters may be used to express the tape selection and control rules listed above in Table 1. One such tape selection control unit is diagrammed in FIGURES 2, 3, 4, and 5.

Figure 2:
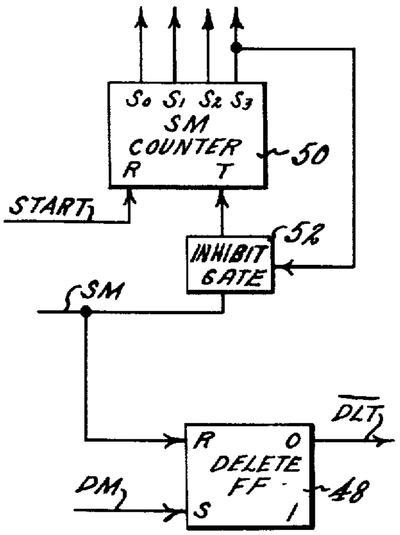
FIGURE 2 is a block diagram of a counting circuit for initiating an operation independent of meaningless comparison results, and a circuit for providing message deletion signals.

FIGURE 2 is a block diagram of a delete message signalling circuit 48 and of a start message counter unit 50. A delete flip-flop 48 is provided to generate a signal to prevent transcription of a message to an output tape. The delete flip-flop 48 is set upon a recognition of a special delete symbol at the A recognition gates 22A of FIGURE 1 and is reset by the application of an SM signal by the SM "or" circuit 23 of FIGURE 1. The output of the reset side of the delete flip-flop 48, $\overline{DLT}$ is applied to the tape selection logic circuits. As described in greater detail below, the setting of the delete flip-flop 48 disables output tape selecting circuits and output tapes are not in condition to accept messages.

The start message counter 50 may be any 4-position counter having a trigger terminal T and a reset terminal R. The counter 50 provides an output on four terminals S0, S1, S2, S3, representing, respectively, the first, second, third and fourth counts.

The output of an inhibit gate 52 is connected to the trigger terminal T of the counter 50. Start message recognition signals, SM, from the start message "or" circuit 23 of FIGURE 1 are applied to one input of the inhibit gate 52. The inhibit, or blocking input is connected to the S3 output terminal of the SM counter 50.

In operation, and with reference to FIGURE 1, the start signal applied to the tape selection and control unit 18 of FIGURE 1 is also applied to the reset terminal R of the start message counter 50. The S0 output terminal is energized and the output is applied to select tape A, 10A, for operation, as will be shown in greater detail in connection with FIGURES 4 and 5 below. Tape A, 10A is started and information signals are detected. At the occurrence of the SM signal at the A recognition gates 22A, the SM recognition pulse output of the SM "or" circuit 23 is applied to the inhibit gate 52, triggering the SM counter 50 to energize the S1 output.

The S1 output is applied to select tape B, 10B for operation next. After the A criterion has been placed in the A memory 30A, the S1 signal acts like a comparison result and the decision to run tape B is effectuated. As tape B, 10B, runs, the start message signal from the B recognition gate 22B is applied through the SM "or" circuit 23 to trigger the SM counter 50 and the S2 output is energized, generating a decision to run tape F, 10F. The SM signal from the F recognition gates 22F through the SM "or" circuit 23 triggers the SM counter 50 to energize the S3 output. The S3 output inhibits the gate 52 preventing further triggering pulses at the SM counter 50, and, as may be seen in FIGURES 4 and 5 below, permits the comparator-justifier 32 decisions to effect tape selection and control.

Figure 3:
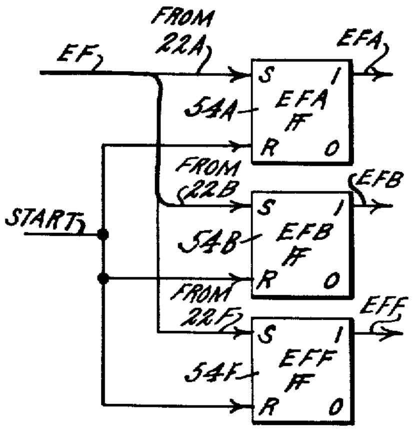
FIGURE 3 is a diagram of a control signal generating circuit.

FIGURE 3 is a block diagram of an end file signalling unit which may be a part of the tape selection and control unit 18. An end file signalling unit may be provided for each of the input tapes. For simplicity, only one such unit is described in detail although a separate unit is provided for each input tape.

A special character, end of file, EF, is placed after the last message of a group on any tape and may be recognized at the respective character recognition gates 22A, 22F, 22B. The EF signal is applied from the A character recognition gate 22A to the set terminal, S, of an end of file A or EFA flip-flop 54A, the set or (1) output of which is labelled EFA and is applied to various elements of the tape selection and the control unit 18.

To reset the EFA flip-flop 54A, the start signal is applied to the reset terminal, R, of the EFA flip-flop 54A.

Figure 4:
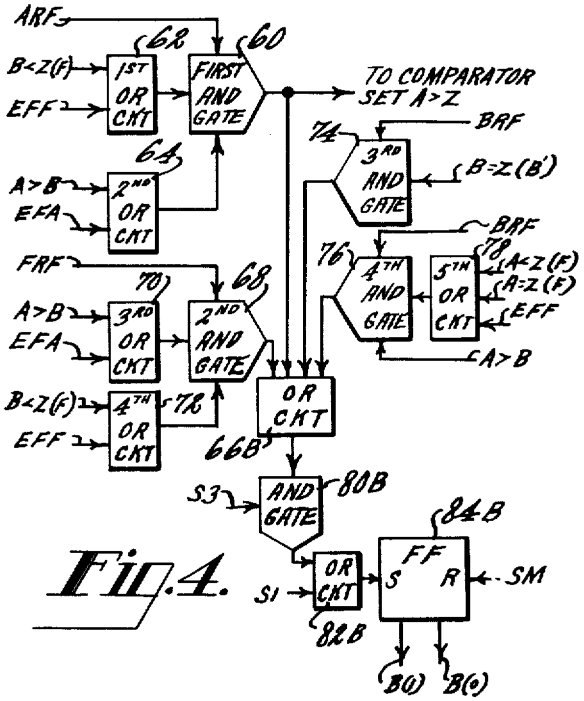
FIGURE 4 is a diagram of list tape selecting circuits.

A similar flip-flop circuit (not shown) may be provided to respond to the recognition of a special "end of data" symbol, ED, which may also be recognized in the recognition gates 22A, 22B, 22F. An EDA flip-flop might be set by the ED signal from the A recognition gates 22A and reset by an SM signal from tape A, 10A. The ED signal could also be applied to the tape control circuitry to cause the exhausted tape to be disconnected and rewound, and to control the connection of a new tape to the same trunk. The set output of the EDA flip-flop may enable an "and" gate (not shown) to provide a tape start signal when the new tape is connected, and its tape control circuits signal that the tape is in condition to run. A circuit is shown in FIGURE 4 suitable to control the selection of the list tape, which, in the present embodiment may be tape B, 10B.

A comparison result, $B<Z$ is applied to one input of a two-input first "or" circuit 62, the second input of which is connected to the (1) output of the EFF flip-flop 56F. The output of the first "or" circuit 62 is applied to a first input terminal of a three-input first "and" gate 60.

The $A>B$ comparison result is applied to one input of a two-input, second "or" circuit 64 whose second input is connected to the (1) output of the EFA flip-flop 56A. The output of the second "or" circuit 64 is applied to the second input terminal of the first "and" gate 60, whose third input is connected to the ARF source.

The first "and" gate 60 output connects to one input of a select B "or" circuit 66B. The output of the first "and" gate 60 is also applied to the comparator-justifier unit 32 of FIGURE 1, to apply a setting impulse to the $A>Z$ flip-flop (not shown) to provide the $A>Z$ output for the next comparison.

A second input to the select B "or" circuit 66B is connected to the output of a three-input second "and" gate 68, one input of which is connected to the FRF signal source. A second input is connected to the output of a two-input third "or" circuit 70. An $A>B$ signal is applied to one input of the third "or" circuit 70, and the EFA signal is applied to the second input. A third input of the second "and" gate 68 is connected to the output of a fourth "or" circuit 72, the inputs of which are the $B<Z$ signal and the EFF signal.

The output of a two-input third "and" gate 74 connects to another of the inputs of the select B "or" circuit 66B. The inputs to the third "and" gate 74 connect with the BRF signal source and the $B=Z$ comparison result output.

A fourth input to the select B "or" circuit 66B is connected with the output of a three-input fourth "and" gate 76. One input to the fourth "and" gate 76 connects to the BRF signal source and a second input connects to the output of a fifth "or" circuit 78, the inputs of which are the $A<Z$ signal, $A=Z$ signal, and the EFF signal. The third input to the fourth "and" gate 76 is the $A>B$ signal.

The output of the select B "or" circuit 66B is applied to one input of a two-input B selection "and" gate 80B, whose second input is connected to the S3 output of the SM counter 50 of FIGURE 2. The output of the B selection "and" gate 80B connects to one input of a two-input B selection "or" circuit 82B, the second input of which is connected to the S1 terminal of the SM counter 50 of FIGURE 2.

The output of the B selection "or" circuit 82B is applied of the set terminal S of a B selected flip-flop 84B, whose reset terminal R is connected to the output of the SM "or" circuit 23 of FIGURE 1. The B selected flip-flop 84B supplies a B (1) signal from the set side and a B (0) signal from the reset side. These signals may be applied to any suitable tape control unit to control the actual starting and stopping of tape B by energization of the tape B control unit 12B. Suitable tape start and stop circuits are disclosed in the above-mentioned copending Guerber, Hobbs, and Spielberg application.

In operation, the tape B, 10B is selected whenever the B message has the smallest criterion, or the S1 signal is produced. If tape B is running, it continues to run if the same message is being read a second time and the criterion is, therefore, equal to the criterion in the B memory 30B whose output in this instance is applied to the Z comparison terminal of the comparator-justifier 32. The B tape 10B is also selected to run in the event that any other input tape is running and the End File signal EF has come from the tape that would be otherwise selected to run.

The B selection "and" circuits 80B prevents a tape selection based on comparison results until a message from each of the input tapes has been read and the SM signal from the third tape message has advanced the SM counter 50 to S3. The B selection "or" circuit 82B selects tape B to run at the start of an operation only after the first message of the A tape has been read and its SM signal has been counted to produce the S1 signal.

The B selected flip-flop 84B is reset after a tape is started and the SM signal has been detected. A tape selection decision is generated each time an input message is received from any input tape. Since B tape contains only criteria of messages which are to be extracted, its contents never transfer to an output tape. However, the tape does advance to present a new extraction criterion after each desired messages has been found in the other reference tapes and has been written to an output tape.

Figure 5:
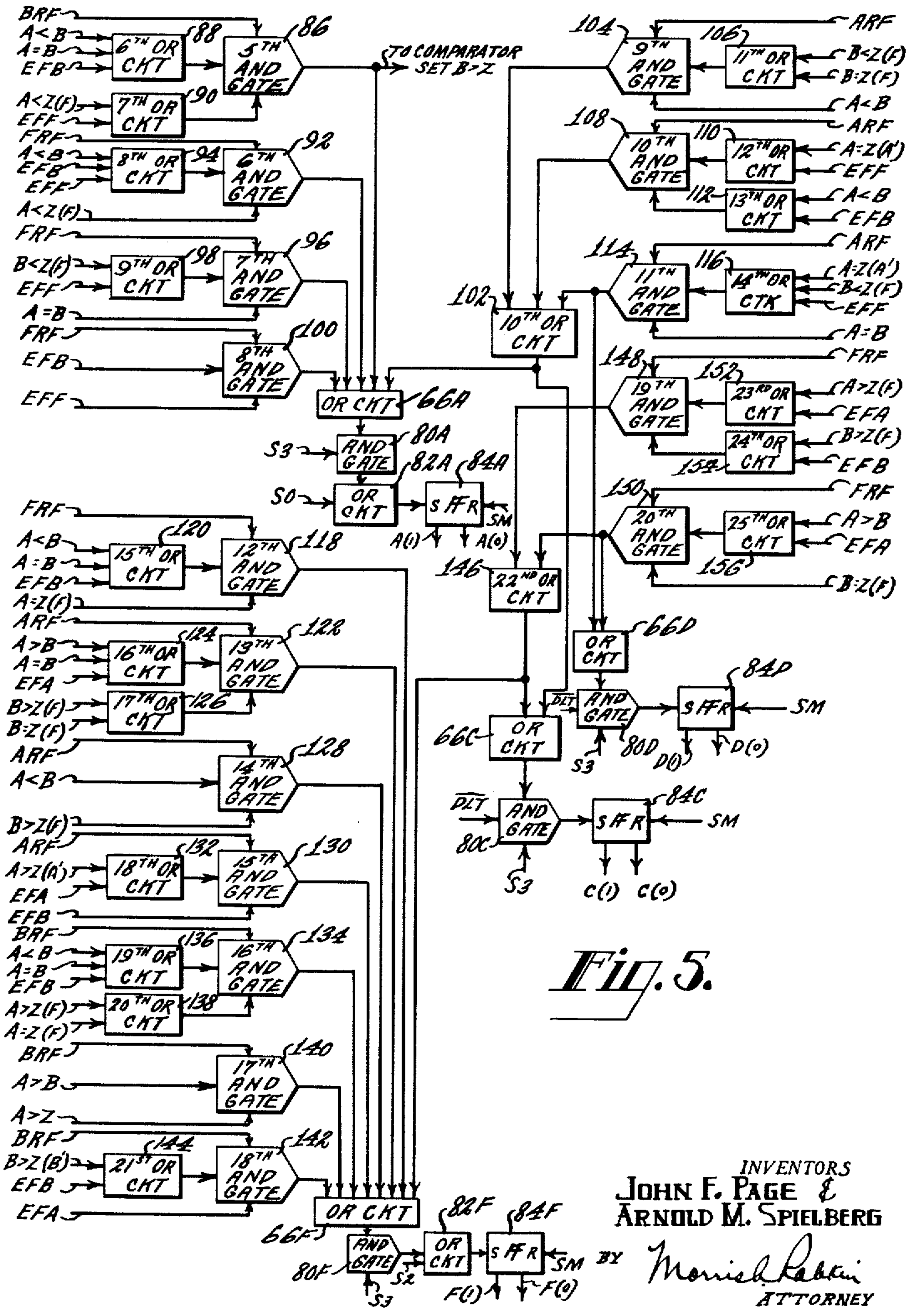
FIGURE 5 is a diagram of output and file tape selecting circuits.

FIGURE 5 is a block diagram of logic for the selection of one of the other reference tapes for input and for selecting either or both of the output tapes.

Tapes A and F 10A, 10F are selected through a logical circuit similar to that for the tape B described above in connection with FIGURE 4. An A selected flip-flop 84A and an F selected flip-flop, 84F, provide selected signals. The A and F selected flip-flops 84A, 84F, are set respectively by the serially combined outputs of A and F selection "and" gates 80A, 80F, and A and F selection "or" circuits 82A, 82F. The outputs of select A and select F "or" circuits 66A, 66F, are applied respectively to the input of the A and F selection "and" gates 80A, 80F. The A selection "or" circuit 82A is also energized by the S0 signal and the F selection "or" circuit 82F is also energized by the S2 signal.

The inputs to the select A "or" circuit 66A are connected to the outputs of various logical elements, which connections will be described in detail below. In the present embodiment, a five-input select A "or" circuit 66A is used to apply signals to set the selected flip-flop 84A.

The output of a three-input fifth "and" gate 86 connects to one input of the select A "or" circuit 66A and also to the comparator-justifier unit 32 of FIGURE 1, to apply a setting impulse to the $B>Z$ flip-flop (not shown). The inputs to the fifth "and" gate 86 connect to a BRF signal source, the output of a three-input sixth "or" circuit 88, and the output of a two-input seventh "or" circuit 90. The $A<B$, $A=B$, and EFB signals are applied to the input of the sixth "or" circuit 88. The $A<Z$ and EFF signals are applied to the seventh "or" circuit 90.

The output of a three-input sixth "and" gate 92 connects to a second input of the select A "or" circuit 66A. The sixth "and" gate 92 is enabled by an FRF signal, the output of a three-input eighth "or" circuit 94, and the $A<Z$ signal. The $A<B$, EFB, and EFF signals are applied each to a separate input of the eighth "or" circuit 94.

A three-input seventh "and" gate 96 is connected to apply a signal to a third input of the select A "or" circuit 66A. The inputs of the seventh "and" gate 96 connect to the FRF signal source, the $A=B$ signal, and the output of a two-input ninth "or" circuit 98, whose inputs are the $B<Z$ and EFF signals.

A fourth input to the select A "or" circuit 66A connects to the output of a three-input eighth "and" gate 100, the inputs of which are the FRF, the EFB, and the EFF signals.

The output of a three-input tenth "or" circuit 102, connects to another of the select A "or" circuit 66A inputs, and is also connected to one input of a two-input select C "or" circuit 66C. A first input to tenth "or" circuit 102 connects to the output of a three-input ninth "and" gate 104, the inputs of which are the ARF signal, the $A<B$ signal, and the output of a two-input eleventh "or" circuit 106. The $B<Z$, $B=Z$ signals are applied respectively to the eleventh "or" circuit 106 inputs. The output of a three-input tenth "and" gate 108 connects to a second tenth "or" circuit 102 input. The inputs of the tenth "and" gate 108 connect, respectively: to the ARF signal source; the output of a two-input twelfth "or" circuit 110, whose inputs connect respectively to the $A=Z$ and EFF signal sources; and the output of a two-input thirteenth "or" circuit 112, whose inputs connect respectively, to the $A<B$ and EFB signal sources.

A three-input eleventh "and" gate 114 has one input connected to the ARF signal source, a second input connected to the $A=B$ signal source, and the third input connected to the output of a three-input fourteenth "or" circuit 116, whose inputs are connected respectively to the $A=Z$, $B<Z$, and EFF signal sources. The output of the eleventh "and" gate 114 is connected both to the third input of the tenth "or" circuit 102 and to one input of a two-input select D "or" circuit 66D.

Tape F, 10F, is run under the control of the tape F control unit 12F which is energized by tape start and stop currents (not shown) connected to the outputs of the F selected flip-flop 84F. The other tapes are controlled in a similar fashion. In one embodiment, the select F "or" circuit 66F has eight inputs. Seven of the inputs of the select F "or" circuit 66F are connected each to the output of a different one of seven three-input "and" gates, which bear the ordinal number designations, twelve through eighteen.

The inputs of the twelfth "and" gate 118 connect to the FRF signal source, the $A=Z$ signal, and the output of a three-input fifteenth "or" circuit 120 whose inputs are $A<B$, $A=B$, and EFB. The thirteenth "and" gate 122 inputs connect with the ARF signal source and, respectively, the outputs of a three-input sixteenth and a two-input seventeenth "or" circuit 124, 126. The $A>B$, $A=B$, and EFA signal sources connect to the inputs of the sixteenth "or" circuit 124. The $B>Z$ and $B=Z$ signal sources connect with the seventeenth "or" circuit 126 inputs.

The fourteenth "and" gate 128 inputs connect to the ARF, $A<B$, and $B>Z$ signal sources. The ARF and EFB signal sources and the output of a two-input eighteenth "or" circuit 132, the inputs of which connect with the $A>Z$ and EFA signal sources, are applied to the inputs of the fifteenth "and" gate 130.

The sixteenth "and" gate 134 inputs connect with the BRF signal source and the outputs of a three-input nineteenth and a two-input twentieth "or" circuit 136, 138. The nineteenth "or" circuit 136 inputs connect to the $A<B$, the $A=B$, and the EFB signal sources. The $A>Z$ and $A=Z$ signals are applied to the inputs of the twentieth "or" circuit 138. The BRF, $A>B$, and the $A>Z$ sources apply signals to the inputs of the seventeenth "and" gate 140. The eighteenth "and" gate 142 inputs connect to the BRF and EFA signal sources and to the output of a two-input twenty-first "or" circuit 144, whose inputs connect to the $B>Z$ and EFB signal sources.

The eighth input to the select F "or" circuit 66F, connects to the output of a two-input twenty-second "or" circuit 146, the output of which is also applied to the select C "or" circuit 66C. The twenty-second "or" circuit 146 inputs connect, respectively, to the outputs of a three-input nineteenth and a three-input twentieth "and" gate 148, 150. The nineteenth "and" gate 148 inputs connect to the FRF signal source, and the outputs of a two-input twenty-third and a two-input twenty-fourth "or" circuit 152, 154. The $A>Z$ and EFA signals are applied to the twenty-third "or" circuit 152 inputs, and the $B>Z$ and EFB signals are applied to the twenty-fourth "or" circuit 154 inputs.

The twentieth "and" gate 150 inputs are connected to the FRF signal source, the $B=Z$ signal source, and the output of a two-input twenty-fifth "or" circuit 156, the inputs to which are the $A>B$ and EFA signals. The twentieth "and" gate 150 output is also applied to the select D "or" circuit 66D whose output is applied to the D selection "and" gate 80D.

In similar fashion, the output of the select C "or" circuit 66C, is applied to the C selection "and" gate 80C. The C and D selection "and" gates 80C and 80D each have a second input connected to the S3 terminal and a third enabling input connected to the $\overline{\text{DLT}}$ signal output of the delete flip-flop 48 of FIGURE 2. The outputs of the C and D selection "and" gate are applied respectively to set the C and D selection flip-flops 84C, 84D, which are reset by the SM signal from the SM "or" circuit 23 of FIGURE 1.

It may be seen that several other mechanizations of the logical rules described above are possible to produce the same result. The comparator-justifier 32 output signals may be applied to logically equivalent combinations of "and" gates and "or" circuits to provide outputs responsive to the same conditions.

In operation, as each tape runs and its criterion is selected and compared, of the possible decisions, three result from each comparison between A and B, A and Z, and between B and Z within the comparator-justifier 32. A set of nine flip-flops (not shown) when set, generate the possible comparison result signals.

The Z message signals may, at different times, represent different messages. When tape F is running, the F message criterion is applied to the Z terminal and the A—Z and B—Z comparisons are really comparisons with the F criterion. However, if tape A runs, the criterion previously stored in the A memory 30A is applied to the Z terminal for the A—Z comparison and the B—Z comparator is disabled, "remembering" the result of the last comparison of B with F in the B—Z comparison result elements. Similarly, if tape B is running, the A—Z comparison is disabled and the comparison with F result is "remembered."

Whenever tape A and tape B run sequentially, the previous tape F comparison results are lost. In order to run F, an arbitrary comparison result is generated at the first "and" gate 60, which sets both the $A>Z$ flip-flop (not shown) and the B selected flip-flop 84B or at the fifth "and" gate 86 which sets both the $B>Z$ flip-flop (not shown) and the A selected flip-flop 84A.

As may be seen in FIGURE 5, with tape B running, and the $A>Z$ result produced in the sixteenth and seventeenth "and" gates 134, 140 act to set the F selected flip-flop 84F, no matter what the result of the A—B comparison. Similarly, with tape A running, the $B>Z$ comparison result, the thirteenth and fourteenth "and" gates 122, 128 combined set the F selected flip-flop 84F regardless of the A—B comparison result. In summary, it may be seen that whenever a message on either tape A or F is equal to a message on tape B, both of the output tapes C and D are run. The A message is transferred if $A<F$ or $A=F$, the F message is transferred if $F<A$.

In other words, if a message on the list tape is equal to the criterion of the message on the new message tape, when the new message is run, it is transferred both to the extracted tape and to the updated file tape. If the old and new messages are equal the old file tape is then run first and neither output tape runs, so that the message is not transferred. When the next old file message criterion is compared, a decision to run the new message tape is generated. The new message tape is then run and both output tapes are started to transfer the new message.

Messages from the list tape are never transcribed on an output tape. The messages from the old file tape are transferred whenever they are not superseded by a new message. The new message is transferred either when it is to be added to the file in its proper order or when it supersedes an old file message.

Should any messages in the reference file become obsolete, they may be deleted from the file. The criteria of these messages, each including a special "delete" symbol may be written on the new message tape with the other updating information in proper sequence. The occurrence of the delete symbol during the operation is recognized in the character recognition gates 22A of FIGURE 1 and the delete flip-flop 48 of FIGURE 2 is set. The C and D comparison "and" gates 80C and 80D of FIGURE 5 are then both disabled. The old file message is run but not transcribed. The new message superseding it is run but the selection of output tapes is disabled and the new message, too, is discarded.

What is claimed is:

1. In an information handling system in which information is arranged in messages each having a criterion, said system comprising first and second input storage devices containing messages arranged in sequential order of criterion, a third input storage device containing a sequentially ordered list of criteria, apparatus for (1) merging the messages contained in said first and second input devices and for transferring the merged messages to a first output storage device, and (2) extracting messages from one of said first and second input storage devices according to said list and transferring the extracted messages to a second output storage device comprising, in combination: said first, second and third input storage devices, said first output storage device and said second output storage device; control devices respectively for all of said storage devices; first and second gate means connected to the inputs of said first output storage device and said second output storage device, respectively; means connecting the outputs of said first and second input storage devices to both of said gate means; a comparator connected to receive and compare the criteria of the output messages of all said input storage devices and providing signals indicating the comparison results; and logic control means responsive to said signals for enabling selected combinations of said control devices and said gates in accordance with the desired said transferring of messages.

2. The combination recited in claim 1 wherein each of said storage devices includes a magnetic tape on which the said messages are recorded, and wherein each of the said storage devices further includes a tape transport mechanism.

3. The combination recited in claim 1 wherein said second storage device contains old file messages and said first storage device contains new reference messages for updating said old file messages.

4. In an information handling system having a plurality of input and output storage devices, and wherein it is desired to merge information messages contained in a first and second of said input devices into a first one of said output storage devices, and to extract and transfer information messages from at least one of said first and second input storage devices to a second of said output storage devices in accordance with a list contained in a third of said input storage devices, each of said messages having a criterion, said messages being arranged in each of said input devices sequentially according to said criterion, the combination comprising: a first memory device individual to one of said first and second input devices and connected to receive the criterion output thereof; a second memory individual to the third of said input devices and connected to receive the criterion output thereof; a comparator connected to receive and compare the contents of said first and said second memory with each other and with the next criterion output presented timewise at said input devices; and control means connected to receive the outputs of said comparator for enabling selected combinations of outputs of said input storage devices and the inputs of said output storage devices.

5. In an information handling system, the combination recited in claim 4 wherein the control means includes: means for enabling the input of said first of said output storage devices and the output of one of said first and second input storage devices if the criterion of the message output of said one of said input storage devices is less than that of the other of said first and second input storage devices and if it is not greater than that of said third of said input storage devices; means for enabling also the input of said second of said output storage devices if the criteria of the output messages of said one of said input storage devices and said third of said input storage devices are equal; means for enabling only the output of said third of said input storage devices if its output criterion is less than that of the said first and second of said input storage devices; and means for enabling only the output of said second of said input storage devices if the criteria of the message outputs of said first and second of said input storage devices are equal to each other and not greater than that of said third of said input storage devices.

6. In an information handling system, the combination recited in claim 5 wherein said second of said input storage devices contains old file messages, said first of said input storage devices contains new updating reference messages, and said third of said input storage devices contains a list of messages to be extracted.

7. In an information handling system, the combination recited in claim 6 wherein said first of said output storage devices contains revised and updated file messages and said second of said output storage devices contains a list of messages extracted according to said program.

8. In an information handling system, the combination recited in claim 4 wherein each of said input and said output storage devices includes a magnetic tape transport, and wherein said messages are recorded on magnetic tape.

9. In an information handling system having a plurality of input and output storage devices, and wherein it is desired to merge information messages contained in at least a first and second of said input storage devices into at least one of said output storage devices, and wherein it is further desired to extract information messages from at least one of said first and second input storage devices into another of said output storage devices in accordance with a list of message criteria contained in a third of said input storage devices, each of said messages having an order-determining criterion, the combination of a first memory device connected to receive and selectively recirculate the order-determining criterion of the last-read message output of said first of said input storage devices; a second memory device connected to receive and selectively recirculate the order-determining criterion of the last-read message output of said third of said input storage devices; a buffer storage connected to receive the outputs of said first and second input storage devices, means connecting the output of said buffer storage to the input of each of said output devices; a comparator connected to receive and compare the outputs of said first memory device and said second memory device with each other and with the criterion portion of the next message output from said input devices; and control means connected to receive the output of said comparator and responsive thereto for enabling selectively the outputs of said input storage devices and the inputs of said output storage devices.

References Cited in the file of this patent

UNITED STATES PATENTS

| | | |
|---|---|---|
| 2,702,380 | Brustman et al. | Feb. 15, 1955 |
| 2,721,990 | McNaney | Oct. 25, 1955 |
| 2,798,216 | Goldberg et al. | July 2, 1957 |
| 2,911,624 | Booth et al. | Nov. 3, 1959 |

FOREIGN PATENTS

| | | |
|---|---|---|
| 748,336 | Great Britain | Apr. 25, 1956 |